United States Patent [19]

Asami et al.

[11] Patent Number: 4,717,172
[45] Date of Patent: Jan. 5, 1988

[54] SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Olympus Optical Co., Ltd., Japan

[21] Appl. No.: 824,262

[22] Filed: Jan. 30, 1986

[30] Foreign Application Priority Data

Feb. 4, 1985 [JP] Japan .................................. 60-20671
Feb. 4, 1985 [JP] Japan .................................. 60-20672

[51] Int. Cl.⁴ .............................................. B60G 17/00
[52] U.S. Cl. .................................................... 280/707
[58] Field of Search ................ 280/707, DIG. 1, 6 H, 280/6 R, 714, 703

[56] References Cited

U.S. PATENT DOCUMENTS

| 2,973,969 | 3/1961 | Thall | 280/124 |
| 2,978,254 | 4/1961 | Bundorf | 280/707 |
| 3,632,131 | 1/1972 | Engfer | 280/707 |
| 3,884,496 | 5/1975 | Ito et al. | 280/6 H |
| 4,162,083 | 7/1979 | Zabler | 280/707 |
| 4,350,354 | 9/1982 | Dotti et al. | 280/6 H |
| 4,433,849 | 2/1984 | Ohmori | 280/6 R |
| 4,513,833 | 4/1985 | Sheldon | 188/299 |
| 4,540,188 | 9/1985 | Meloche et al. | 280/6 R |
| 4,589,676 | 5/1986 | Meloche et al. | 280/707 |
| 4,593,920 | 6/1986 | Natsume et al. | 280/6 R |

FOREIGN PATENT DOCUMENTS

| 2225303 | 4/1974 | France . |
| 48309 | 9/1983 | Japan | 280/707 |
| 59-26638 | 2/1984 | Japan . |
| 59-23712 | 2/1984 | Japan . |
| 59-63218 | 10/1984 | Japan . |

OTHER PUBLICATIONS

Patent Abstract of Japan, vol. 8, No. 116 (M-299) [1553], May 30, 1984; & JP-A-59 23712 (Hino Jidosha) 07-02-1983 (Cat. D,A).
European Search Report for Application No. EP 86 10 1360.
(840,258) Mizuguchi, M., Chassis Electronic Control Systems for the Mitsubishi 1984 Galant, Society of Automotive Engineers, 3184, 280-707.

Primary Examiner—John J. Love
Assistant Examiner—Karin L. Ferriter
Attorney, Agent, or Firm—Parkhurst & Oliff

[57] ABSTRACT

When a single shock due to a bump or dip in a road surface is detected at the front wheel of a vehicle running on the road, the characteristic of the air suspensions is immediately altered to improve comfort of ride thereof. For that purpose, a distance between the body of the vehicle and the front wheel is detected and when the distance exceeds a predetermined value, the suspension characteristic is altered to a softer state by communicating the air chambers of the front and the rear air suspensions. Further, the pressures of the air chambers are detected and, in case the pressure difference is greater than predetermined value, the communicating operation is prohibited in order to prevent an abrupt change of the vehicle posture.

8 Claims, 17 Drawing Figures (B)

(A)

RIGHT FRONT WHEEL VEHICLE HEIGHT SENSOR (B)

SUSPENSION CONTROLLER

BACKGROUND OF INVENTION

1. Field of the Invention

The present invention relates to a suspension controller for a vehicle, particularly to a suspension controller which is effective against a single shock caused by a bump or dip in a road surface on which an automobile is running.

2. Background Art

Conventionally, the spring constant, damping force, bush characteristic or stabilizer characteristic of each of various suspension components provided between a body of a vehicle and its wheels is altered under control depending on conditions of a road surface or running conditions of the vehicle. This is to prevent the vehicle from being shocked or vibrated and to maintain control and the stability of the vehicle. This can be accomplished, for example, by altering the spring constant of an air spring of a suspension depending on conditions of the road surface, by altering the damping force of a shock absorber, or by simply making the characteristic of a bush or a stabilizer variable. This approach was proposed in the published unexamined Japanese patent applications Nos. Sho-59-23712 and Sho-59-26638. In such control, when a vehicle height sensor detects that the vehicle is running on a rough road or when a brake sensor or an accelerator sensor detects that the front of the vehicle has gone up or down, the characteristic of each suspension of the vehicle is altered to maintain good control and stability of the vehicle running on the rough road, or to prevent the front of the vehicle from going up or down further. However, under the above-mentioned conventional control, the vehicle is not determined to be running on a rough road until a large turbulence is continuously detected by the vehicle height sensor. When the vehicle is judged to be running on a rough road, the spring constants of the suspensions for all the wheels are increased to produce the desired effect. If the vehicle passes over a joint of road patches or a single bump or dip, the vehicle usually receives only one shock and then resumes running on a flat part of the road again, so that the characteristic of each suspension is not altered. For this reason, the passengers of the vehicle are not protected from unpleasant shock due to such single bump or dip. This is different from the case where the vehicle is running on a rough road having continuous bumps or dips.

SUMMARY OF THE INVENTION

The first object of the present invention is to control the gas suspensions provided between a body of a vehicle and its wheels, to keep control and stability of the vehicle and to provide the passengers of the vehicle with a comfortable ride.

The second object of the present invention is to alter the characteristic of the gas suspensions of a vehicle running over such a single bump or dip in a road surface such as a joint of road patches in order to keep control and stability of the vehicle and to provide a comfortable ride.

The third object of the present invention is not to disturb the current posture of the running vehicle by avoiding abrupt alteration control of the suspension characteristic.

The fourth object of the present invention is to return the characteristic of the gas suspensions to the original state as soon as the vehicle resumes running on a flat part of the road after passing over the single bump or dip in the road surface, to always control the suspensions to a characteristic appropriate to the condition of the road surface at any point in time.

According to the present invention, a suspension controller for a vehicle having suspensions which comprise gas chambers for gas suspensions between the body and front and rear wheels respectively comprises the following means in order to attain the objects.

(a) front vehicle height detector by which a distance between the front wheel and the body of the vehicle is detected to generate a front vehicle height signal;

(b) judgement means by which the front vehicle height signal is compared with a predetermined reference signal to generate a judgement result signal when the front vehicle height signal is greater than the predetermined reference signal; and (c) suspension characteristic alteration means which comprise a passage connecting the gas chambers of the front and rear suspensions and opening means that open the passage depending on the judgement result signal.

The front vehicle height detector not only detects a distance between the front wheel and the body but also generate a front vehicle height signal to send it to the judgement means. And the front vehicle height signal is not necessarily restricted to a displacement of the wheel from the average position, but may also sense the speed of displacing, the acceleration of displacing or the amplitude of the displacement.

Judgement means receive the front vehicle height signal and compare it with a predetermined reference signal. When the front vehicle height signal is smaller than the predetermined reference signal, the judgement means generates no signal and the gas suspension characteristic is kept in a normal state. When the front vehicle height signal is greater than the predetermined reference signal, however, the judgement means generates a judgement result signal.

The gas chambers of the front and rear gas suspensions are connected to one another to communicate the gas chambers, but in normal state, the gas chambers are not connected by the opening means disposed in the connecting passage. When the suspension characteristic alteration means receive the judgement result signal, they output a control signal to the opening means commanding the opening means to open the connecting passage. Then the gas chambers of the front and rear gas suspensions become connected to alter the spring constant of the gas suspensions to a softer state than normal. This will absorb the inevitable shock that the rear wheels undergo a short time after the front wheels pass the single bump or dip.

The suspension controller may further include pressure detector which detect pressures of the gas chambers of the front and rear suspensions and which generate a pressure difference signal when the pressure difference between the gas chambers of the front and rear suspensions is smaller than a predetermined value, and control means which generate a control signal when it receives both the judgement result signal and the pressure difference signal. When the loads are greatly different between the front and the rear parts of the vehicle, the gas pressures are also greatly different between the front and the rear suspensions gas chambers. If the chambers are connected in spite of the great pressure difference, the current posture of the vehicle changes abruptly, and control and stability of the vehicle is deteriorated. The pressure detector and the control means prevent this.

The judgement means of the suspension controller generate a return signal a predetermined time, advantageously depending on the vehicle speed, after the judgement result signal is generated. The opening means disposed in the connecting passage close the passage in response to the return signal to return the gas suspension characteristic to the normal state after the rear wheels have passed the bump or dip. When the control means are provided, the return signal is generated by the control means, instead.

DETAILED DESCRIPTION OF PREFERRED EMBODIMENTS

Figure 1:
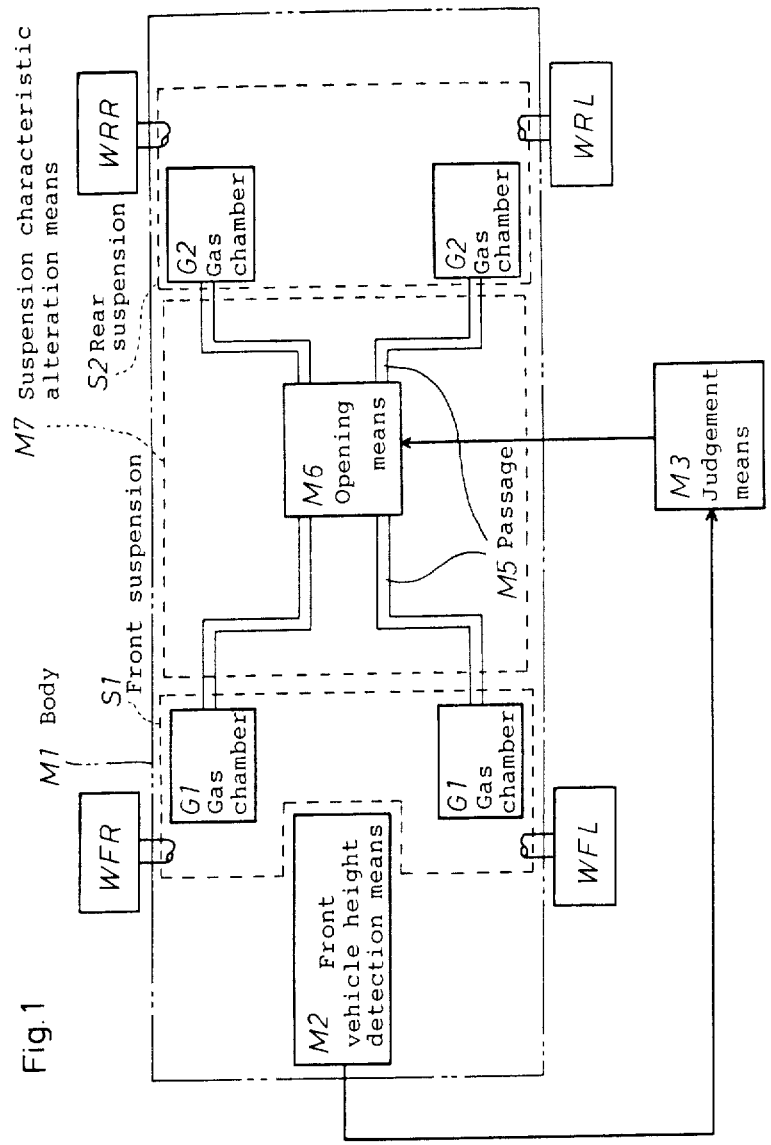
FIG. 1 is a schematic of the first embodiment of the present invention.

FIG. 1 is a schematic of the first embodiment of the present invention. In this embodiment, a distance between the body M1 of an automobile and its front wheels WFR or WFL is detected by a front vehicle height detector M2 to generate a front vehicle height signal and send it to a judgement means M3. The front vehicle height signal is compared with a predetermined reference signal by the judgement means M3 to generate a judgement result signal which is sent to suspension characteristic alteration means M7. Alteration means M7 comprises passages M5 connecting gas chambers G1 of the front suspensions S1 and gas chambers G2 of the rear suspensions S2 and opening means M6 disposed among the passage M5. WRR and WRL denote a right rear wheel and a left rear wheel respectively.

Figure 2:
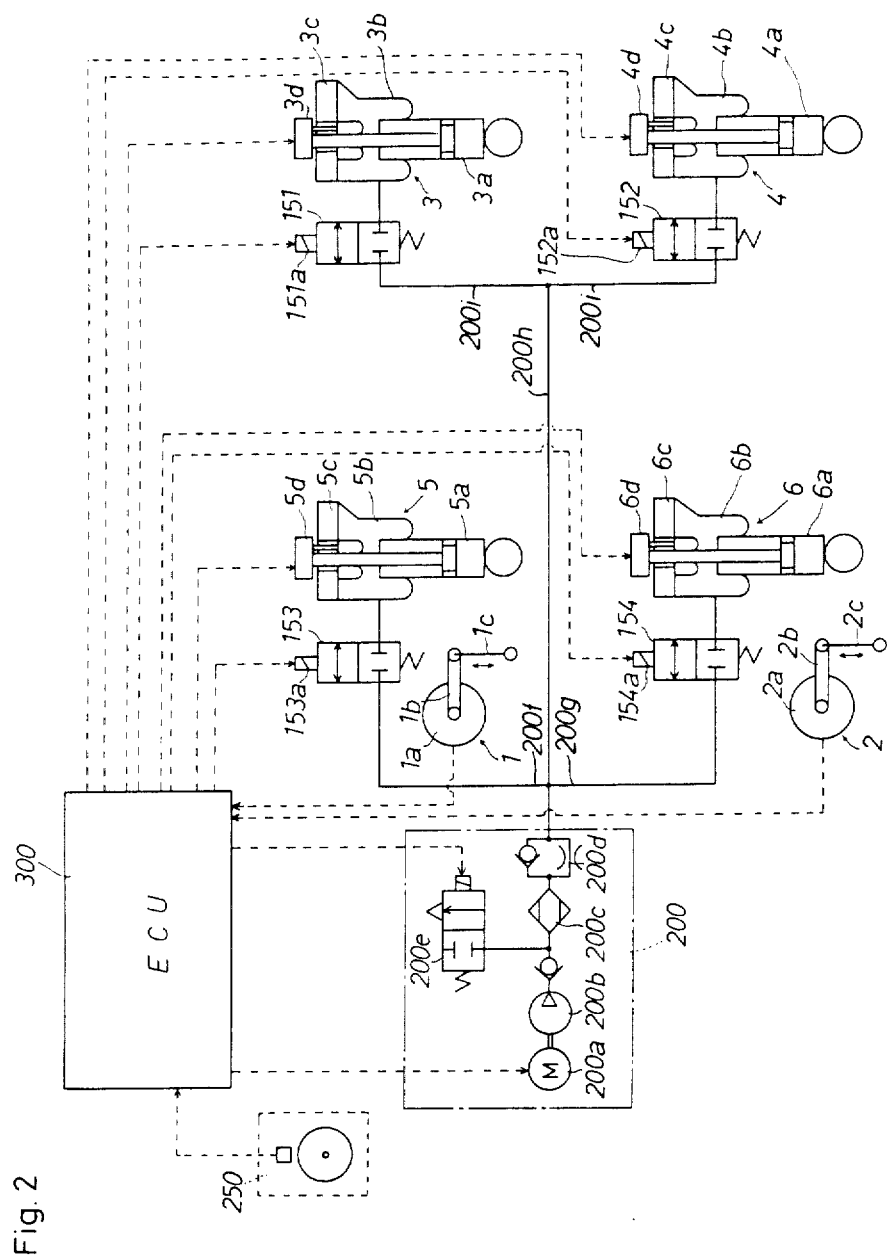
FIG. 2 is a detail of the first embodiment.

FIG. 2 shows details of the construction of the first embodiment. A right front vehicle height sensor 1 is provided between the body and right front wheel of the automobile to detect the distance between the automobile body and a right suspension arm, which follows the motion of the wheel. A left front vehicle height snsor 2 is provided between the body and left front wheel of the vehicle to detect the distance between the vehicle body and a left suspension arm. The short cylindrical bodies 1a and 2a of the vehicle height sensors 1 and 2 are secured on the vehicle body. Links 1b and 2b extend from the center shafts of the bodies 1a and 2a substantially perpendicular with the center shafts. Turnbuckles 1c and 2c are rotatably coupled to the ends of the links 1b and 2b oposite the bodies 1a and 2a. The ends of the turnbuckles 1c and 2c opposite the links are rotatably coupled to portions of the suspension arms. A potentiometer, whose electric resistance changes depending on the rotation of the center shaft of the body of each vehicle height sensor is built in each of the bodies of 1a and 2a of the vehicle height sensors 1 and 2. The potentiometer produces a voltage proportional to the vehicle height. Although the vehicle height sensors of the above-mentioned type are used in this embodiment, vehicle height snesors of such other type may be used. For example, plural light interrupters can be provided in the body of each sensor, and a disk having a slit coaxial with the center shaft of the sensor can turn on or off the light interrupters depending on the change in the vehicle height in order to detect the height. FIG. 2 also shows an air suspension 3 which is provided between the suspension arm (not shown in the drawings) for the right rear wheel of the vehicle and the body thereof and which extends in parallel with a suspension spring (not shown in the drawings). The air suspension 3 including a shock absorber 3a, a main air chamber 3b, an auxiliary air chamber 3c and an actuator 3d in the main chamber 3b has a spring function, a vehicle height adjustment function and a shock absorber function. Similar air suspensions 4, 5 and 6 are provided for the left rear wheel, right front wheel and left front wheel of the vehicle, respectively.

Figure 3:
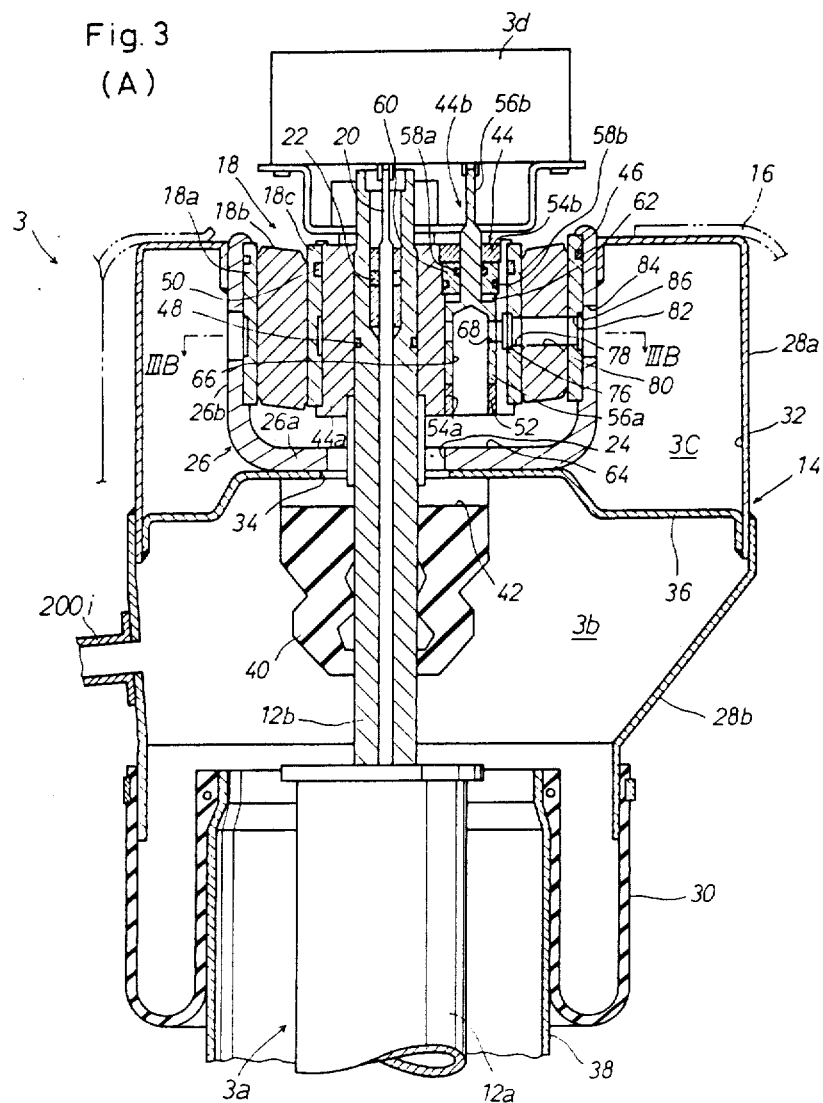
FIG. 3(A) is a sectional view of the main part of an air suspension.
FIG. 3(B) is a sectional view along a line IIIB—IIIB shown in FIG. 3(A).
Figure 3:
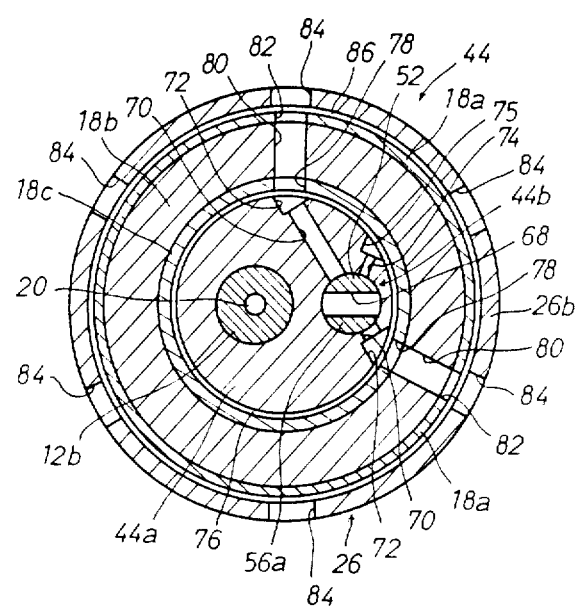

FIGS. 3(A) and 3(B) show a construction of the main part of the air suspension 3. FIG. 3(B) shows a sectional view along a line IIIB—IIIB shown in FIG. 3(A). The other air suspensions 4,5 and 6 have construction similar to the suspension 3. The air suspension 3 includes a conventional shock absorber 3a composed of a piston and a cylinder, and an air spring unit 14 provided in conjunction with the shock absorber. An axle (not shown in the drawings) is supported at the lower end of the cylinder 12a of the shock absorber 3a. An elastic cylindrical assembly 18 for elastically supporting a piston rod 12b to the vehicle body 16 is provided at the upper end of the piston rod 12b extending from the piston (not shown in the drawings) slidably fitted in the cylinder 12a. The shock absorber 3a is a conventional buffer whose damping force can be varied by operating the valve function of the piston. A control rod 20 for adjusting the damping force is liquidtight and rotatably fitted with a sealing member 22 in the piston rod 12b.

The air spring unit 14 has a chamber 32 which is defined by a circumferential member 26 comprising a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a. Both the chambers 3b and 3c are filled with compressed air. The partition member 36 is fitted with a conventional buffer rubber 40 which can be brought into contact with the upper end of the cylinder 12a. The buffer rubber 40 has a passage 42 for connecting the openings 24 and 34 to the main air chamber 3b.

The elastic cylindrical assembly 18 is disposed inside the circumferential member 26 whose wall 26b defines the inside circumferential surface of the auxiliary air chamber 3c, in such manner that the assembly 18 surrounds the piston rod 12b. The cylindrical elastic assembly 18 is provided with a valve unit 44 for controlling the communication of both the air chambers 3b and 3c. The assembly 18 comprises an outer cylinder 18a, a cylindrical elastic member 18b and an inner cylinder 18c which are disposed concentrically to each other. The cylindrical elastic member 18b is secured on both the cylinders 18a and 18b. The outer cylinder 18a of the assembly 18 is press-fitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically connected to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and and the valve casing 44a. An annular air sealing member 50 is tightly packed in between the inner cylinder 18c and the valve casing 44a.

The valve casing 44a has a hole 52 which is open at both the ends and which extends in parallel with the piston rod 12b. A rotary valve 44b is rotatably supported in the hole 52. The valve 44b comprises a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closng the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber 3b through the openings 24 and 34 and the passage 42 of the buffer rubber 40, if formed in the lower portion of the elastic cylindrical assembly 18. The main portion 56a of the valve 44b has a recess 66 open to the chamber 64, and has a communication passage 68 extending through the main portion 56a in a diametral direction thereof across the recess 66.

The valve casing 44a, which houses the valve 44b, has a pair of air passages 70, each of which can communicate at one end with the communication passage 68, as shown in FIG. 3(B). The air passages 70 extend on almost the same plane outwards in a diametral direction of the hole 52, toward the peripheral surface of the valve 44b. The other end of each air passage 70 is open to the peripheral surface of the valve casing 44a through a face hole 72. An air passage 74, which can communicate at one end with the communication passage 68, extends on almost the same place as the pair of air passages 70 toward the peripheral surface of the valve casing 44a, between the pair of air passages 70 ouside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b corresponding to the openings 78. The through holes 80 are opened to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with plural openings 84 which are located at equal intervals in the circumferential direction of the member 26 and which extend continuously to the auxiliary air chamber 3c to connect the openings 78 and 82 and the through holes 80 to the auxiliary air chamber 3c. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided corresponding to the two air passages 70 of the valve casing 44a in the embodiment shown in FIG. 3(B), the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber 3a, and a conventional actuator 3d for rotating the valve 44b of the valve unit 44, are provided at the upper end of the piston rod 12b, as shown FIG. 3(A).

Since the air suspension 3 has the above-mentioned construction, the air suspension performs actions described hereinafter. When the valve 44b is kept in such a closed position shown in FIG. 3(B) that the communication passage 68 of the valve does not communicate with any of the air passages 70 and 74 of the valve casing 44a, the main air chamber 3b and the auxiliary air chamber 3c are disconnected from each other so that the spring constant of the suspension 3 is set at a large value. When the actuator 3d has rotated the valve 44b into such a position that the communication passage 68 of the valve communicates with the large-diameter air passages 70 of the valve casing 44a, the main air chamber 3b is connected to the auxiliary air chamber 3c through the communication passage 68 communicating with the main air chamber, the large-diameter air passages 70 and the openings 78 and through holes 80 of the elastic assembly 18 and the openings 82 and 84, so that the spring constant of the suspension 3 is set at a small value. Leveling valves 151-154 are provided for the air suspensions 3-6, respectively, as shown in FIG. 2. A compressed air feed and discharge system 200, which is described below, is connected to or disconnected from the main air chambers 3b-6b of the air suspensions 3-6 by the leveling valves 151-154 depending on whether electricity is supplied to solenoids 151a-154a or not. When the leveling valves 151-154 are opened, compressed air is fed to the air suspensions, the height of the vehicle is increased. If the compressed air is discharged from the air suspensions, the height of the vehicle is decreased. When the leveling valve 151-154 are closed, the height of the vehicle is maintained.

In a compressed air feed and discharge system 200, a compressor 200b is driven by a motor 200a to produce the compressed air. An air drier 200c dries the compressed air to be fed to the air suspensions 3-6, to protect pipes and the parts of the air suspensions from moisture and prevent a pressure abnormality due to a moisture phase change in the main air chambers 3b-6b and auxiliary air chambers 3c-6c of the air suspensions. When the compressed air is fed to the air suspensions, a check valve 200d provided with a fixed orifice is opened. When the compressed air is discharged from the air suspensions, the check valve 200d is closed so that the air flows out through only the fixed orifice. When the compressed air is discharged from the air suspensions 3-6, a releasing solenoid valve 200e is driven so that the compressed air discharged from the air suspensions through the fixed orifice at the check valve 200d and through the air drier 200c is released into the atmosphere. The solenoid valve 200e can be regulated to change the volume of each of the main air chambers of the air suspensions 3-6 to adjust the height of the vehicle.

A vehicle speed sensor 250 is provided in a speedometer, for example, so that the sensor sends out a pulse signal corresponding to the speed of the vehicle, in response to the motion of the axle of the vehicle.

Figure 4:
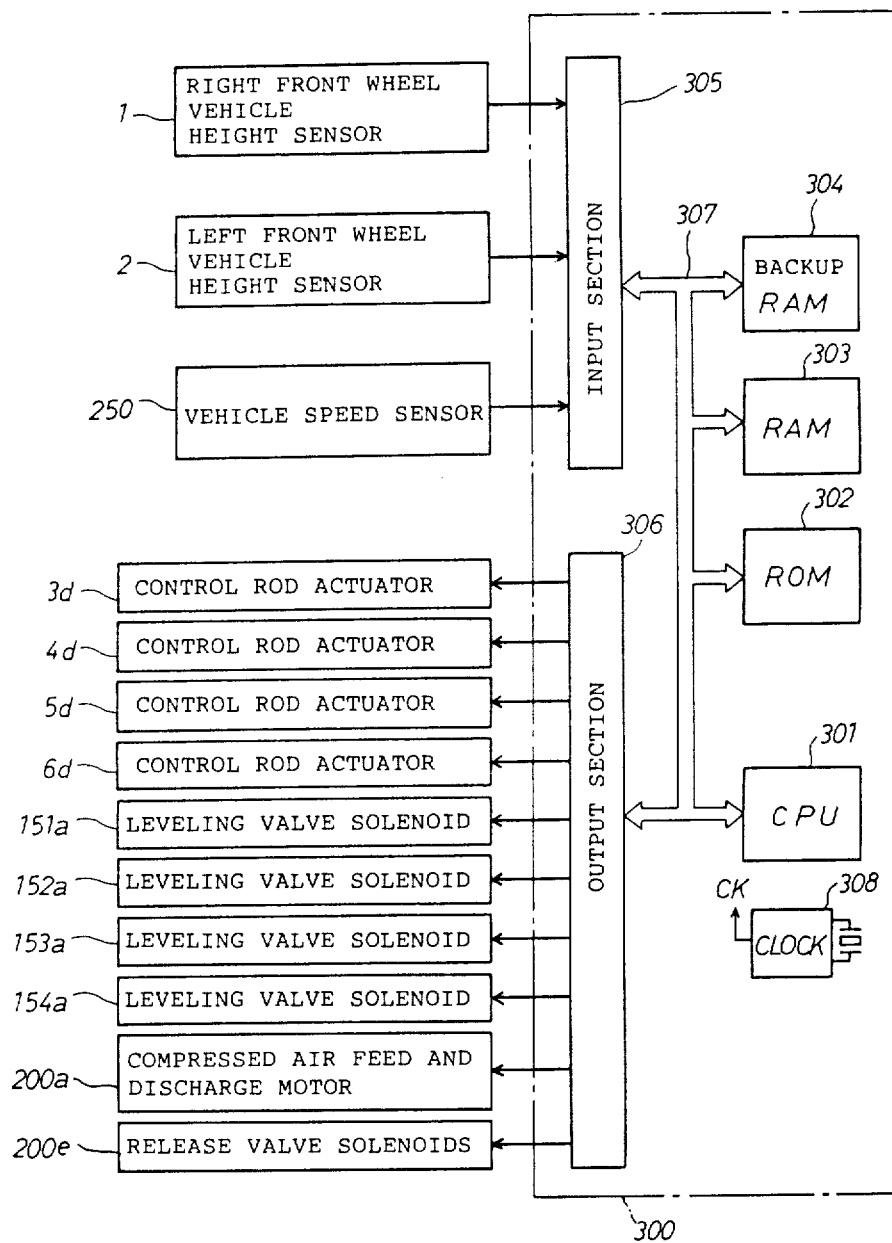
FIG. 4 is a schematic of an electronic control unit (ECU).

The output signals of the vehicle height sensors 1 and 2 and the vehicle speed sensor 250 are entered into an electronic control unit (hereinafter referred to as ECU) 300, which processes these signals to send out drive signals to the actuators 3d-6d of the air suspensions 3-6, the leveling valves 151-154, the motor 200a of the compressed air feed and discharge system 200 and the solenoid valve 200e to perform appropriate control if necessary. FIG. 4 shows the construction of the ECU 300. A central processing unit (hereinafter referred to as CPU) 301 receives the output data from the sensors and performs operations on the data, in accordance with a control program, to carry out proces steps for the control of various units or means or the like. The control program and initial data are stored in a read-only memory (hereinafter referred to as ROM) 302. The data, which are entered in the ECU 300, and data necessary for operations and control, are stored into and read out of a random-access memory (hereinafter referred to as ROM) 303. A backup random-access memory (hereinafter referred to as backup RAM) 304 is backed up by a battery so that even if the ignition key switch of the automobile is turned off, the backup RAM retains data which are needed after the turning-off of the switch. An input section 305 comprises an input port not shown in the drawings, a waveshaping circuit provided if necessary, a multiplexer which selectively sends out the output signals of the sensors to the CPU 301, and an A/D converter which changes an analog signal into a digital signal. An output section 306 comprises an output port not shown in the drawings, and a drive circuit for driving the actuators according to the control signals of the CPU 301 as occasion demands. A bus 307 connects circuit components such as the CPU 301 and the ROM 302, the input section 305 and the output section 306 to each other to transmit data. A clock circuit 308 sends out a clock signal at prescribed intervals to the CPU 301, the ROM 302, the RAM 303 and so forth so that a control timing is set by the clock signal.

Figure 5:
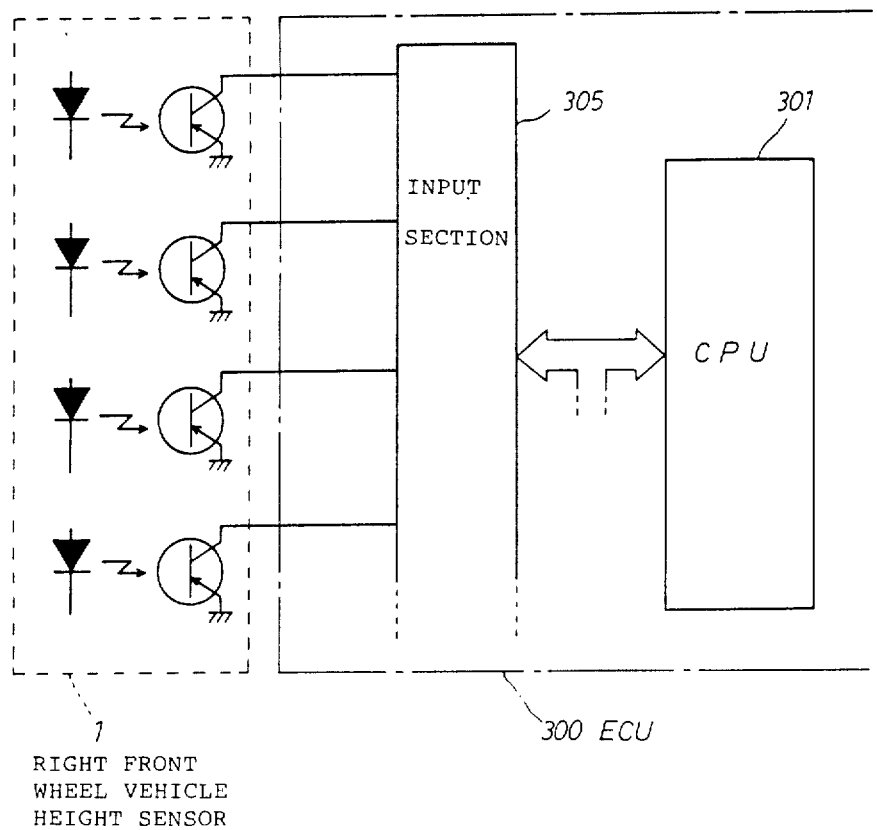
FIG. 5(A) is a schematic of an input section which receives a digital front vehicle height signal.
FIG. 5(B) is a schematic of an input section which receives an analog front vehicle height signal.
Figure 5:
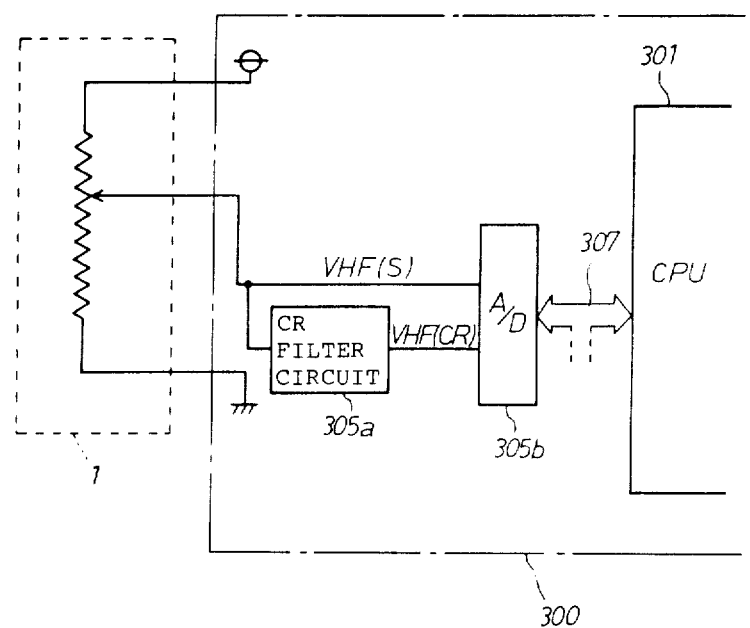

If the output signal of the vehicle height sensor 1 is a digital signal, the signal is transmitted to the CPU 301 through the input section 305 including a buffer as shown in FIG. 5(A). If the output signal of the vehicle height sensor 1 is an analog signal, a construction as shown in FIG. 5(B) is provided. In the latter case, the vehicle height sensor 1 sends out the analog signal of a voltage corresponding to the height of the vehicle. The analog voltage signal is converted into a voltage VHF(CR) indicating an average height of the vehicle, by a CR filter circuit 305a made of a low-pass filter. The voltage VHF(CR) is applied to an A/D converter 305b. The analog voltage signal is also directly applied as a voltage VHF(S) indicating the current height of the vehicle, to the A/D converter 305b. The converter 305b changes both the input signals into digital signals through the action of a multiplexer. The digital signals are transmitted from the converter to the CPU 301. The same thing applies to the left front wheel vehicle height sensor 2.

The process steps, which are performed by the ECU 300, are hereinafter described referring to a flow chart shown in FIGS. 6(A),6(B). The flow chart indicates the process steps performed by the ECU 300 in response to the vehicle height sensor 1 of a linear type which sends out an analog signal, as shown in FIG. 5(B). The process steps are repeatedly performed in a predetermined time such as 5 msec. The outline of the process steps shown in the flow chart is described as follows:

(1) A current vehicle height VHF(S) and an average vehicle height VHF(CR) are determined (Step 540 and 550).

(2) It is judged whether or not the current vehicle height has displaced more than a predetermined value h0 from the average vehicle height (Step 580).

(3) If the current vehicle height is judged to have displaced more than the predetermined value h0 from the average vehicle height, the characteristic of the suspensions for the front and the rear wheels is altered to deal with passing over the bump or dip in the road surface (Step 620). In particular, the spring constants of the air suspensions 3-6 are lowered, i.e., the springs are softened, by opening the leveling valves 151-154 to communicate the main air chambers 3b-6b with one another. The above-mentioned operations (1), (2) and (3) correspond to the main process steps for producing the effect of the present invention, and still another operation (4) mentioned below is added to the main operations (1), (2), and (3) in the embodiment.

(4) Subsequent to the operation (3), the characteristic of the suspension is returned to the original state after the rear wheels pass over the bump or dip in the road surface by closing the leveling valves 151-154 (Step 660).

The details of the process steps are hereinafter described. The process steps are repeatedly performed in every 5 msec. It is first judged whether or not the process steps are being performed for the first time since the activation of the ECU 300 (Step 510). If the process steps are judged to be being performed for the first time, initial setting is effected (Step 520), all variables are cleared all flags are reset. After the initial setting is effected (Step 520) or if the process steps in the routine are judged to be being performed for the second time or later, the speed V of the vehicle is detected (Step 530) as the first step subsequent to the judgement (Step 510), in terms of the output signal of the vehicle speed sensor 250. A current Vehicle height VHF(S) is then detected (Step 540). To detect the current vehicle height, either of the outputs of the vehicle height sensors for the right and left front wheels of the vehicle may be used. Since at least one rear wheel receives a shock whichever of the front wheels has moved up or down due to the bump or dip in the road surface, an average of the outputs of both the vehicle height sensors for the front wheels may be used or the larger one of the outputs may be used. An average of the past outputs of the vehicle height sensor 1 is determined to set an average vehicle height (Step 550). In this embodiment, the average vehicle height VHF(CR) is directly determined from the output signal of the vehicle height sensor 1 through the CR filter circuit 305a made of the low-pass filter, as shown in FIG. 5(B). If the vehicle height sensor 1 is sending out a digital signal, the reference vehicle height may be calculated from past vehicle heights VHF(S) measured in the ECU 300. For example, the calculation can be effected by adopting process steps shown in FIG. 7, instead of adopting the process steps in Steps 540 and 550 shown in FIG. 6(B). In the process steps shown in FIG. 7, a current vehicle height VHF(S)n is detected first (Step 710), and an average VHFa,n of the vehicle height is then calculated (Steps 730 and 740) in every predetermined operation unit time tms (Step 720). In Step 730, the following calculation is performed:

$$VHFa,n = \{(k-1)VHFa,n-1 + VHFb,n-1 + VHF(s)n\}/k$$

k: Number of measured values to be averaged
VHFa,n: Average to be calculated currently (n−th time)
VHFa,n−1: Average calculated previously {(n−1)-th time}
VHF(S)n: Measured value of current vehicle height
VHFb,n−1: Value calculated previously for convenience to calculate the average VHFa,n In Step 740, the value VHFb,n is calculated as follows:

$$VHFb,n = mod(k)\{(k-1)VHFa,n-1 + VHFb,n-1 + VHF(S)n\}$$

In such calculation, mod(A) {B} means the value of the remainder in the division of B by A. The process steps in Steps 730 and 740 constitute such a simple method that a value approximate to the average can be calculated if only the value VHFa,n, VHFa,n−1 and VHFb,n−1 are stored in a memory beforehand. As for the simple method, past (k−1) pieces of data do not need to be stored in the memory, so that the space of the memory and the time of the calculation are saved. If the space of the memory and the time of the calculation are large enough, a required number of measured values may be averaged normally.

Figure 6A:
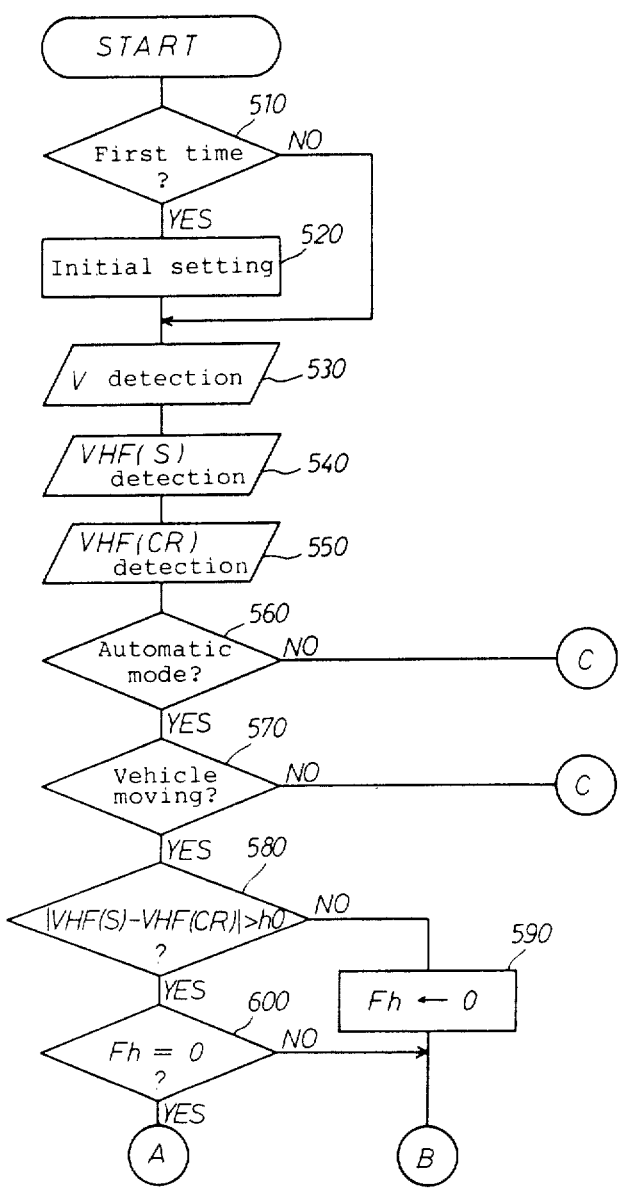
FIGS. 6(A), 6(B) is a flow chart of processing steps which are performed in the ECU of the first embodiment.

After the detection of the average (Step 550) as shown in FIG. 6(A), it is judged (Step 560) whether or not the control of the suspensions is an automatic mode. If the driver of the vehicle has not selected the automatic mode by a manual switch, the process steps in the routine are terminated. If he has selected the automatic mode, it is judged (Step 570) whether or not the vehicle is moving. When the detected output of the vehicle speed sensor 250 is not lower than a predetermined level, the vehicle is judged to be moving. If the vehicle is judged to be moving, it is then judged (Step 580) whether or not the displacement |VHF(S)−VHF(CR)| of the current vehicle height VHF(S) from the average vehicle height VHF(CR) has exceeded a predetermined value h0. If the displacement is judged to be not larger than the predetermined value h0, a flag Fh is reset (Step 590). The flag Fh is for determining the first process steps to be performed since the displacement exceeded the value h0.

Figure 8:
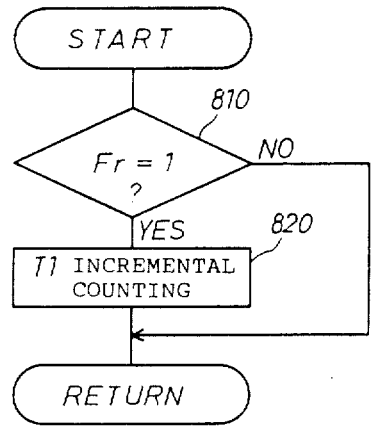
FIG. 8 is a flow chart of some of the process steps which correspond to an incremental counting of a timer.

Next, it is judged (602) whether or not a vehicle height adjustment is under operation. If the vehicle height adjustment is under operation, a flag Fa is set (604) and the vehicle height adjustment operation is stopped (606). That is because, if the main air chambers 3b–6b of the front and the rear suspensions are communicated with one another when the compressed air feed and discharge system 200 is operating to adjust the vehicle height, compressed air is fed to the main air chambers 3b and 4b of the rear suspensions, resulting in an abrupt hardening of the rear suspensions. Then in Step 610, a timer T1 is started and flags Fr and Fh are set. The timer T1 is for counting up the time for which the characteristic of the suspensions is kept altered. The flag Fr is for determining whether or not the timer T1 should be counting, as shown in FIG. 8 which shows a flow chart indicating a routine which is repeatedly executed in every predetermined time. If the flag Fr is already set (Step 810), the timer T1 is caused to perform incremental counting (Step 820).

Figure 6B:
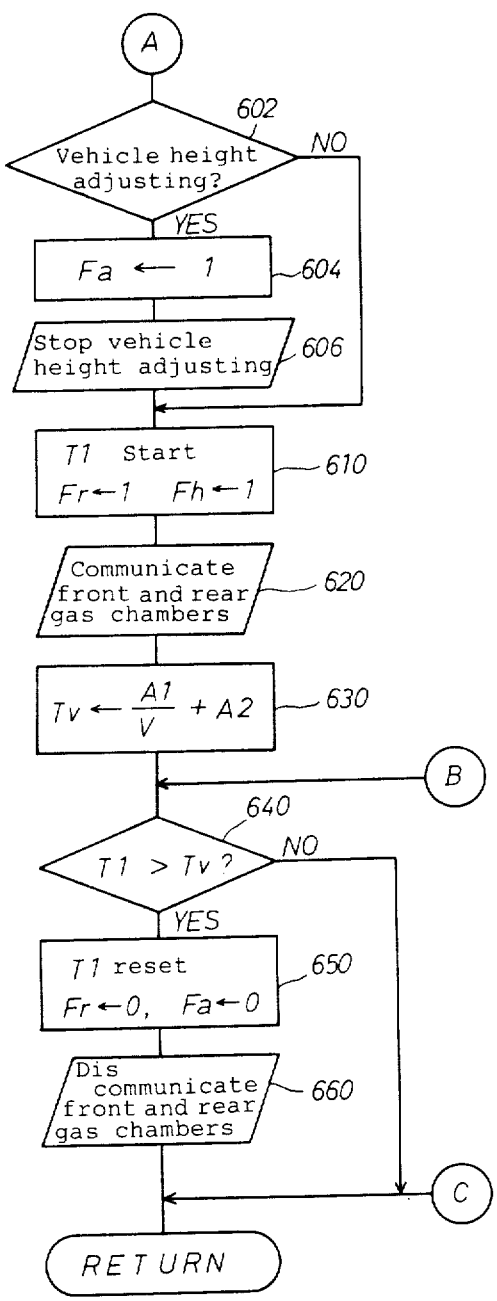
Figure 7:
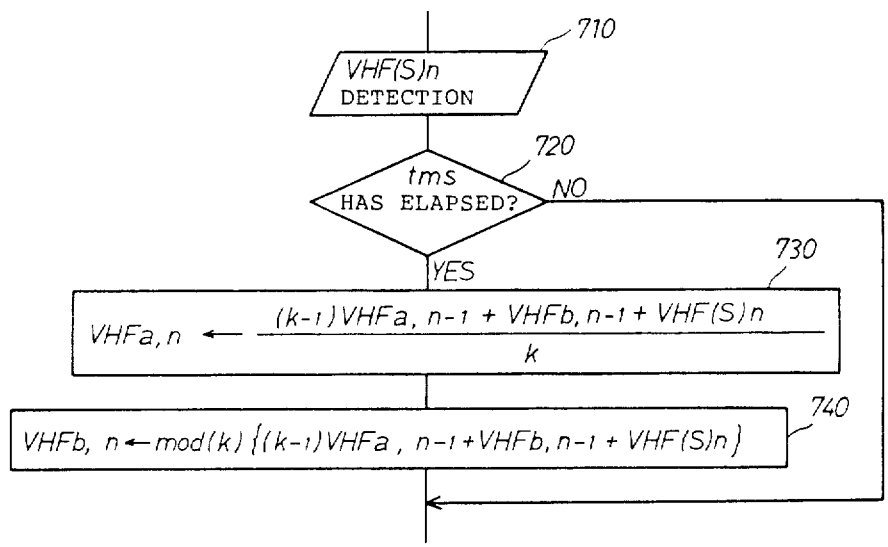
FIG. 7 is a flow chart of the processing steps for calculating an average value of the vehicle height signal.

After Step 610 shown in FIG. 6(B), the characteristic of the suspensions, is altered (Step 620). For this alteration, the CPU 301 sends out a signal to the leveling valves 151 154 to communicate the main air chambers 3b–6b of the air suspensions 3–6 with one another to make the characteristic of the rear suspensions 'soft' or decrease the spring constant thereof. As a result, the shock at each rear wheel is absorbed. It is seldom the case that the front and the rear wheels pass bumps simultaneously, when the prescribed softening effect is void.

After the alteration of the rear wheel suspension characteristic (Step 620), the time Tv from the detection of the bump or dip in the road surface at the front wheel to the passing of the rear wheel over the bump or dip is calculated on the basis of the vehicle speed V as follows:

$$Tv = (A1/V) + A2$$

A1: Wheelbase

A2: Compensatory term (constant)

The compensatory term A2 is determined in consideration of the detection lags of the vehicle height sensor 1 and 2, the time taken for the rear wheel to move over the bump or dip in the road surface, etc.

It is judged (Step 640) through comparison with the count of the timer T1 whether or not the time Tv determined in Step 630 has elapsed since the alteration of the characteristic of the suspensions. If the count of the timer T1 is judged to be not larger than the time Tv, the process steps in the routine are terminated. If the count of the timer T1 is judged to have exceeded the time Tv, in other words, if the time Tv has elapsed since the characteristic of the suspensions was altered to be appropriate to the bump or dip in the road surface, the timer T1 is reset, and the flag Fr is also reset (Step 650). For that reason 'NO' is taken in Step 810, which is for the process step on the incremental counting of the timer T1 as shown in FIG. 8, in the set state of the flag Fr, so that the incremental counting of the timer is stopped.

Finally, the process step for returning the characteristic of the suspensions to the original state is performed (Step 660). That is, the main air chambers 3b–6b of the air suspensions 3–6 are disconnected from one another by closing the leveling valves 151–154. Thus, when the bump or dip in the road surface is detected at the front wheel, the characteristic of the suspensions is altered to prevent the rear portion of the vehicle from being shocked. After the vehicle has passed over the bump or dip, the characteristic of the suspension is returned to the original state.

Figure 9:
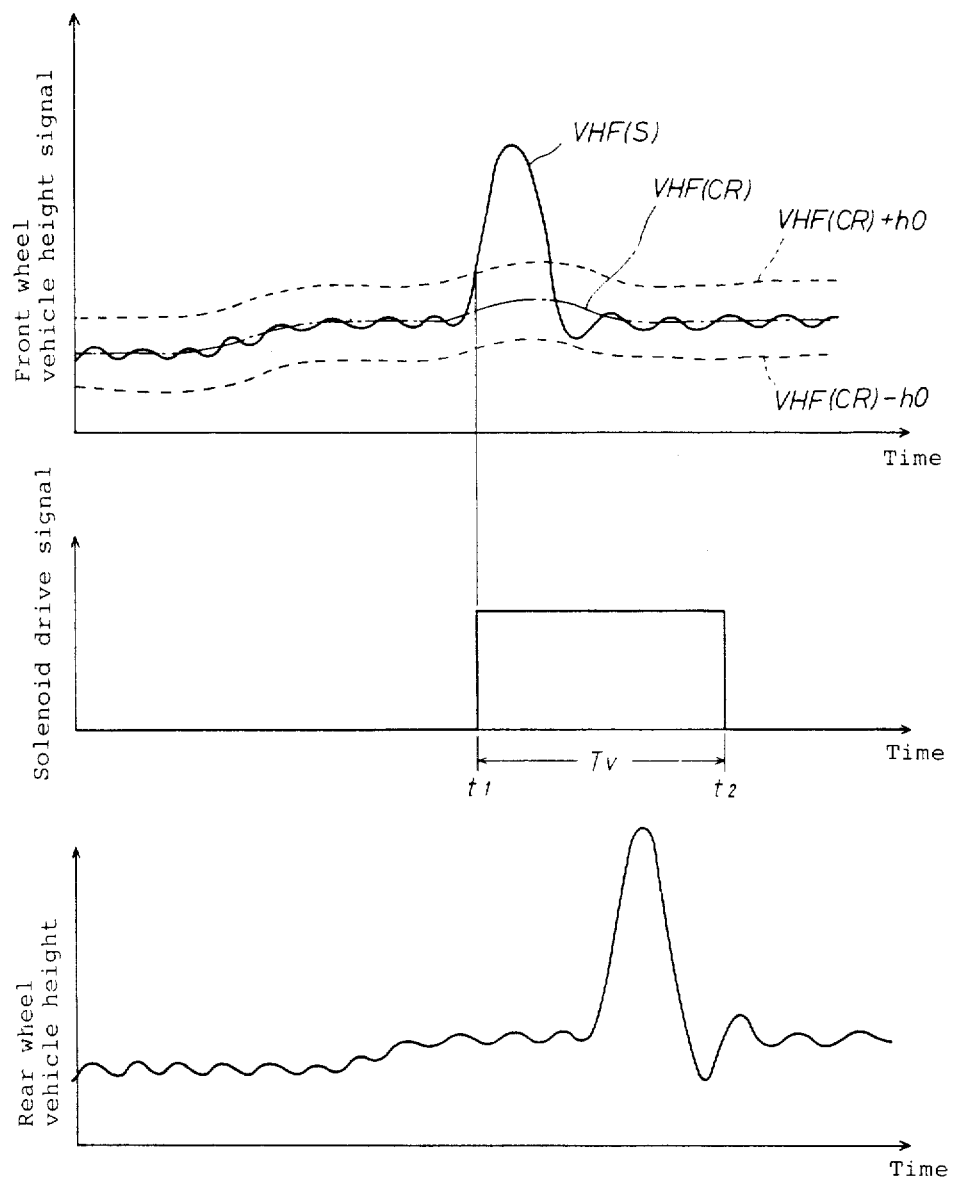
FIG. 9 is time charts of some of the process steps.

FIG. 9 shows time charts of the processing for the abovementioned alteration and returning of the suspension characteristic. Before a time point t1 shown in FIG. 9, the automobile is running on a flat part of the road surface, the vehicle height VHF(S) obtained from the vehicle height sensors 1 and 2 draws waves of small amplitude, and the average vehicle height VHF(CR) obtained from the CR filter circuit 305a draws a smoothed form of the waves. When the front wheel begins to move down into the dip in the road surface, the vehicle height VHF(S) sharply increases. At the time point t1, the vehicle height VHF(S) exceeds VHF(CR)+h0, in other words, it is judged in Step 580 in the flow chart shown in FIG. 6 that |VHF(S)−VHF(CR)| is greater than h0. At the time point t1, the ECU 300 starts sending out the drive signal to the leveling valves 151–154 to operate the solenoids 151a–154a of the air suspensions 3–6. As the drive signal is being sent out to the leveling valves 151–154, the main air chambers 3b–6b are communicated with one another. At a time point t2 which is by the time Tv later than the time point t1, the sending-out of the drive signal is stopped so that the leveling valves 151–154 are closed. Between the time points t1 and t2, the rear wheel moves down into the dip detected at the front wheel. If different drive signals for opening and closing the leveling valves 151–154, respectively, are sent out to the air suspensions 3–6, the opening drive signal is sent out at the time point t1 and the closing drive signal is sent out at the other time point t2. If the front wheel moves up on a bump in a road surface, the vehicle height draws a deepest wave trough and when the current vehicle height VHF(S) has become less than VHF(CR)-h0, the solenoids 151a–54a are driven, too.

In this embodiment, the main air chambers 3b–6b are communicated with one another when the wheels move down into a dip in the road surface, to prevent the vehicle from being shocked. For that reason, the measured vehicle height amplitude at the rear wheel is larger than that of the normal running state.

Since this embodiment has the abovementioned constitution, the rear part of the wheel can be prevented from being shocked. The shocking of the rear wheel would impart an unpleasant vibration to not only the rear seat of the vehicle but also its front seat. Therefore, the prevention of the shocking of the rear part of the vehicle results not only in keeping the whole vehicle from being shocked, but also in improving the comfort of the ride of the vehicle. Since the characteristic of the suspensions is not randomly altered but is set in distinct states for the normal cruising of the vehicle and its running over the bump or dip in the road surface, respectively, control and stability and comfort of the ride in the normal cruising of the vehicle are simultaneously improved as well as those when passing over the bump or dip. In addition the degree of freedom of design of the suspension characteristic is increased.

Figure 10:
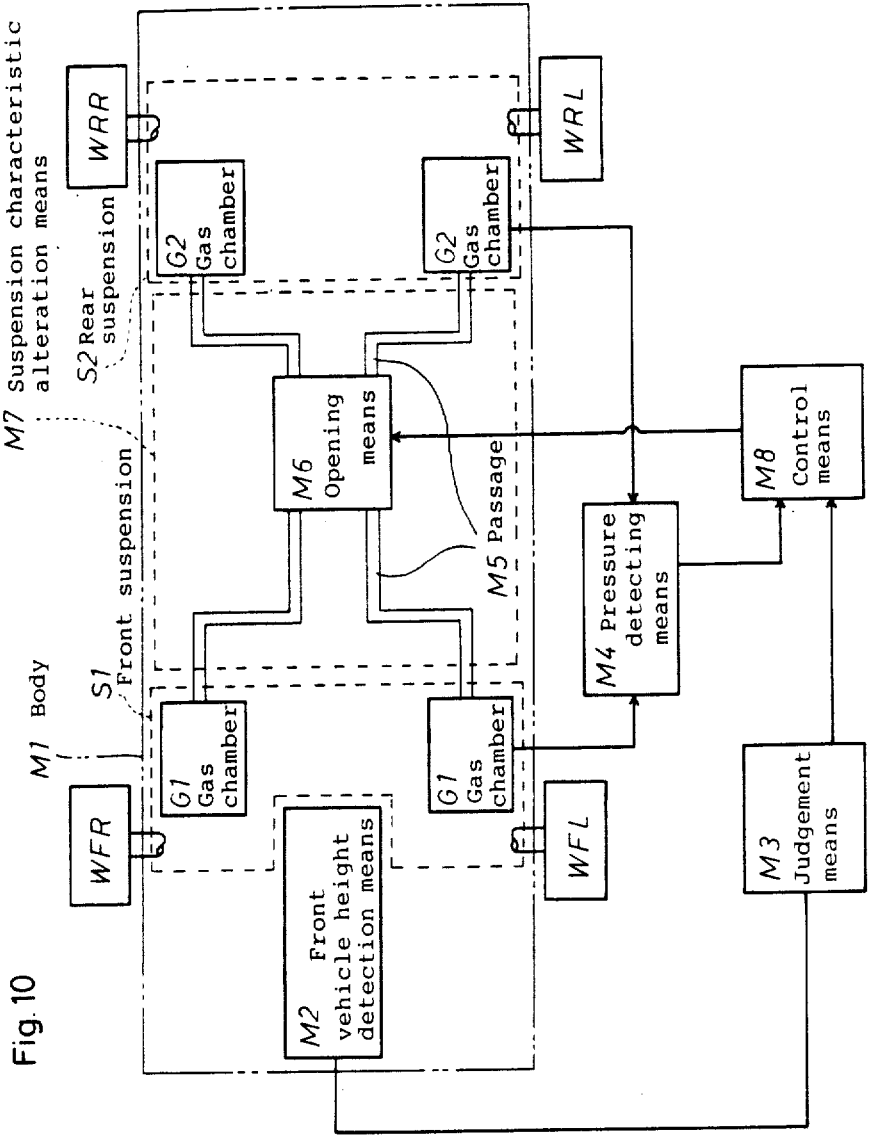
FIG. 10 is a schematic of the second embodiment of the present invention.

The second embodiment of the present invention is hereinafter described. FIG. 10 shows an outline of the constitution of the second embodiment. Compared with that of the first embodiment, FIG. 1, this constitution differs in that it has pressure detection means M4 and control means M8.

In this embodiment, a distance between the body M1 of an automobile and its front wheels WFR and WFL is detected by front vehicle height detection means M2 to generate a front vehicle height signal and send it to a judgement means M3. The front vehicle height signal is compared with a predetermined reference signal by the judgement means M3 to generate a judgement result signal and send it to control means M8. The pressure detection means M4 detect gas pressure of the gas chambers G1 and G2 and send a signal corresponding to the pressure difference of the gas chambers G1 and G2 to the control means M8. The control means M8 make a conditional control over suspension characteristic alteration means M7 which comprise passages M5 connecting gas chambers G1 of the front suspensions S1 and gas chambers G2 of the rear suspensions S2 and opening means M6 disposed among the passages M5. WRR and WRL denote a right rear wheel and a left rear wheel respectively.

Figure 11:
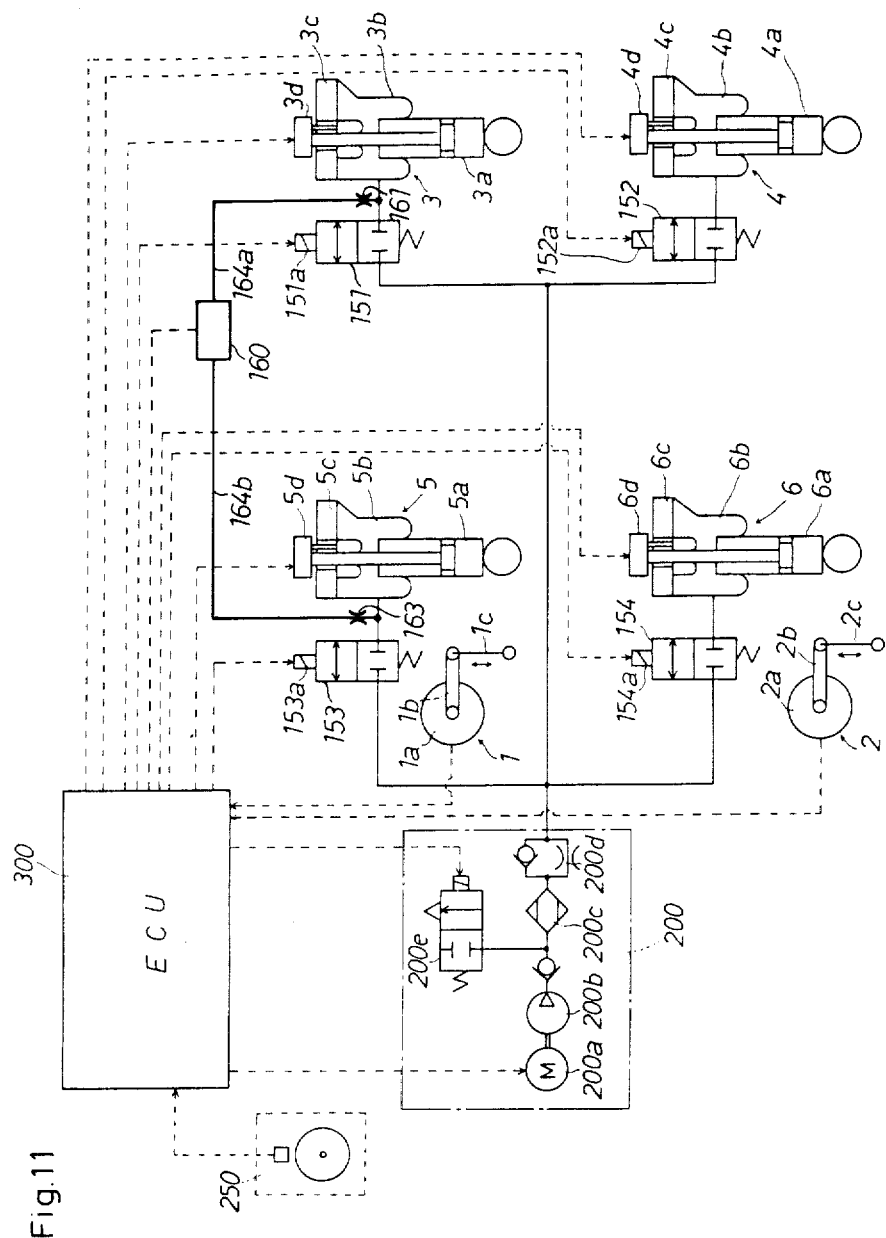
FIG. 11 is a detail of the construction of the second embodiment.
Figure 12:
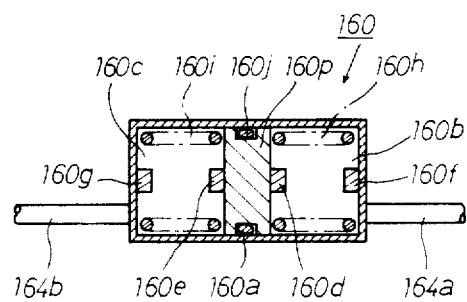
FIG. 12 is a sectional view of a pressure difference switch.

Detailed constitution of the second embodiment is similar to that of the first embodiment which is illustrated in FIGS. 2–5 except that there is a pressure difference switch 160 and the relating apparatus as shown in FIG. 11 and in that there are other process steps prescribed in the ROM 302. First, the different parts relating to the pressure difference switch 160 of the FIG. 11 from those of FIG. 2 are described hereinafter. The main air chambers 3b and 5b of the air suspensions 3 and 5 are connected to the pressure difference switch 160 via passages 164a and 164b which have orifices 161 and 163 respectively as pressure buffers. The pressure difference switch 160, whose constitution is shown in FIG. 12, generates a signal when the pressure difference of the main air chambers 3b and 5b is greater than a predetermined value. In FIG. 12, a piston 160p is slidably disposed in a casing 160a separating it into a first chamber 160b and a second chamber 160c. There are contact points 160d and 160e on both faces of the piston 160p and there are also contact points 160f and 160g on both ends of the casing in opposition to the contact points 160d and 160e respectively. The contact points 160d, 160e, 160f and 160g are connected to the ECU 300. There are springs 160h and 160i on both sides of the piston 160p and a sealing 160j. The piston 160p is displaced by a pressure difference of the air pressures introduced by the passages 164a and 164b. When the pressure difference exceeds a predetermined value represented by a spring constant of the springs 160h and 160i, either the contact points 160d and 160f or 160e and 160g come in contact to send a signal to the ECU 300.

Next, the process steps according to the second embodiment which are performed by the ECU 300 are hereinafter described referring to a flow chart shown in FIGS. 13(A),(B). The flow chart indicates the process steps performed by the ECU 300 in response to the vehicle height sensor 1 of a linear type which sends out an analog signal, as shown in FIG. 5(B). The process steps are repeatedly performed in every predetermined time such as 5 msec. The outline of the process steps shown in the flow chart is described as follows:

(1) A current vehicle height VHF(S) and an average vehicle height VHF(CR) are determined (Steps 1540 and 1550).

(2) It is judged whether or not the pressure difference switch 160 is OFF (Step 1572).

(3) It is judged whether or not the current vehicle height has displaced more than a predetermined value h0 from the average vehicle height (Step 1580).

(4) If the current vehicle height is judged to have displaced more than the predetermined value h0 from the average vehicle height, the characteristic of the suspensions is altered to deal with passing over the bump or dip in the road surface (Step 1620). The process for altering the suspension characteristic is the same as that of the first embodiment. The above-mentioned operations (1), (2), (3) and (4) correspond to the main process steps for producing the effect of the present invention, and still another operation (5) mentioned below is added to the main operations (1), (2), (3) and (4) in the embodiment.

(5) Subsequent to the operation (4), the characteristic of the suspensions is returned to the original state after the rear wheels have passed over the bump or dip in the road surface by closing the leveling valves 151–154 (Step 1660).

The details of the process steps are hereinafter described. The process steps are repeatedly performed in every 5 msec. It is first judged whether or not the process steps are being performed for the first time since the activation of the ECU (Step 1510). If the process steps are judged to be being performed for the first time, initial setting is effected (Step 1520), all variables are cleared and all flags are reset. After the initial setting is effected (Step 1520) or if the process steps in the routine are judged to be being performed for the second time or later, the speed V of the vehicle is detected (Step 1530) as the first process step subsequent to the judgement (Step 1510), in terms of the output signal of the vehicle speed sensor 250. A current vehicle height VHF(S) is then detected (Step 1540). To detect the current vehicle height, either of the outputs of the vehicle height sensor for the right and left front wheels of the vehicle may be used. Since at least one rear wheel receives a shock whichever of the front wheels has moved up or down due to the bump or dip in the road surface, an average of the outputs of both the vehicle height sensors for the front wheels may be used or the larger one of the outputs may be used. An average of the past outputs of the vehicle height sensor 1 is determined to set an average vehicle height (Step 1550). In this embodiment, the average vehicle height VHF(CR) is directly determined from the output signal of the vehicle height sensor 1 through the CR filter circuit 305a made of the low-pass filter, as shown in FIG. 5(B). If the vehicle height sensor 1 is sending out a digital signal, the reference vehicle height may be calculated from past vehicle height VHF(S) measured in the ECU 300. For example, the calculation can be effected by adopting process steps shown in FIG. 7, instead of adopting the processings in Steps 1540 and 1550 shown in FIG. 13(A).

Figure 13A:
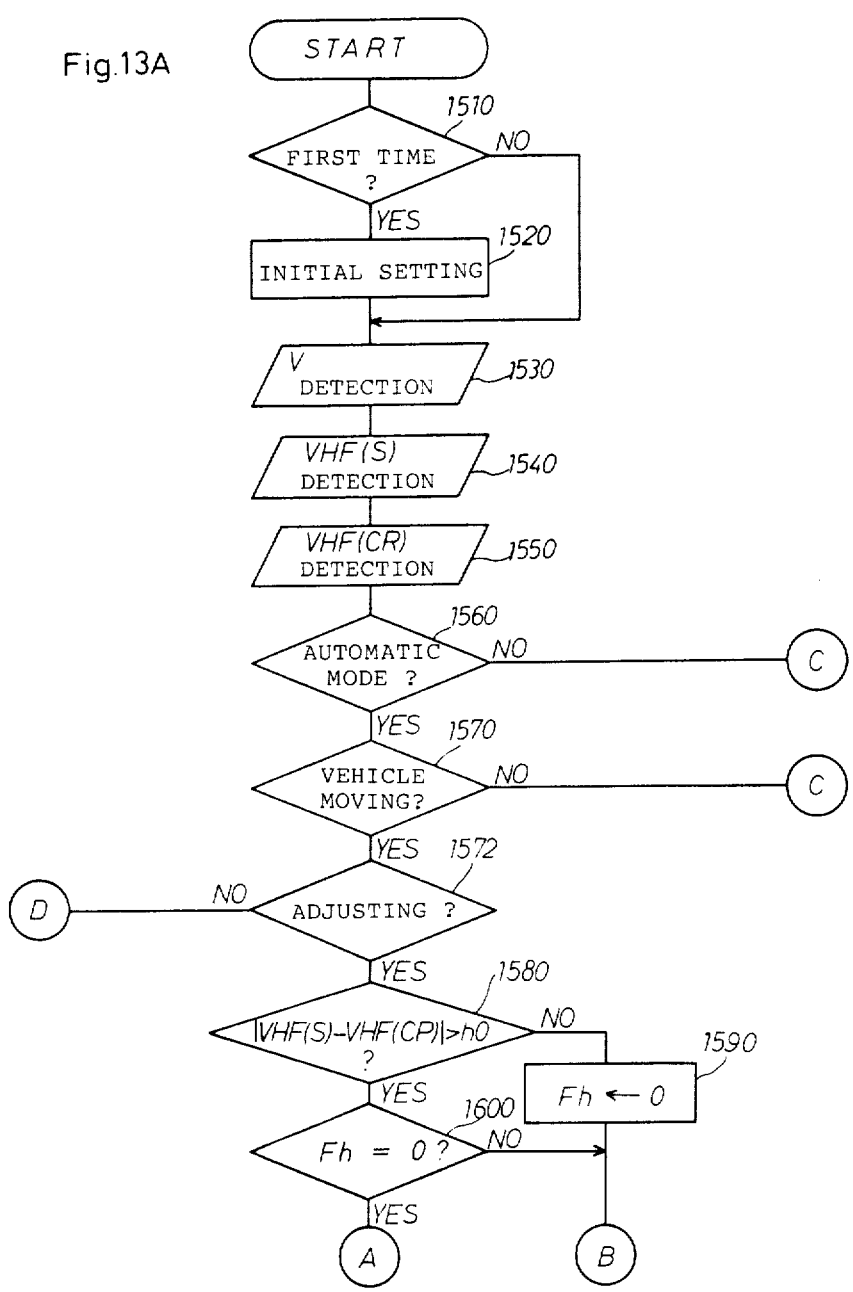
FIGS. 13(A), 13(B) is a flow chart of process steps which are performed in the ECU of the second embodiment.

After the detection of the average (Step 1550) as shown in FIG. 13(A), it is judged (Step 1560) whether or not the control of the suspension is in an automatic mode. If the driver of the vehicle has not selected the automatic mode by a manual switch, the process steps in the routine are terminated. If he has selected the automatic mode, it is judged (Step 1570) whether or not the vehicle is moving. When the detected output of the vehicle speed sensor 250 is not lower than a predetermined level, the vehicle is judged to be moving. If the vehicle is judged to be moving, it is then judged (Step 1572) whether or not the pressure difference switch 160 is OFF. If it is not Off, the current routine is terminated. Otherwise, it is judged (Step 1580) whether or not the displacement |VHF(S)−VHF(CR)| of the current vehicle height VHF(S) from the average vehicle height VHF(CR) has exceeded a predetermined value h0. If the displacement is judged to be not larger than the predetermined value h0, a flag Fh is reset (Step 1590). The flag Fh is for determining the first process steps to be performed since the displacement exceeded the value h0.

Next, it is judged (1602) whether or not a vehicle height adjustment is under operation. If the vehicle height adjustment is under operation, a flag Fa is set (1604) and the vehicle height adjustment operation is stopped (1606). That is because, if the main air chambers 3b–6b of the front and the rear suspensions are communicated with one another when the compressed air feed and discharge system 200 is operating to adjust the vehicle height, compressed air is fed to the main air chambers 3b and 4b of the rear suspensions, resulting in an abrupt hardening of the rear suspensions. Then in Step 1610, a timer T1 is started and flags Fr and Fh are set. The timer T1 is for counting up the time for which the characteristic of the suspensions is kept altered. The flag Fr is for determining whether or not the timer T1 should be counting, as shown in FIG. 8.

Figure 13B:
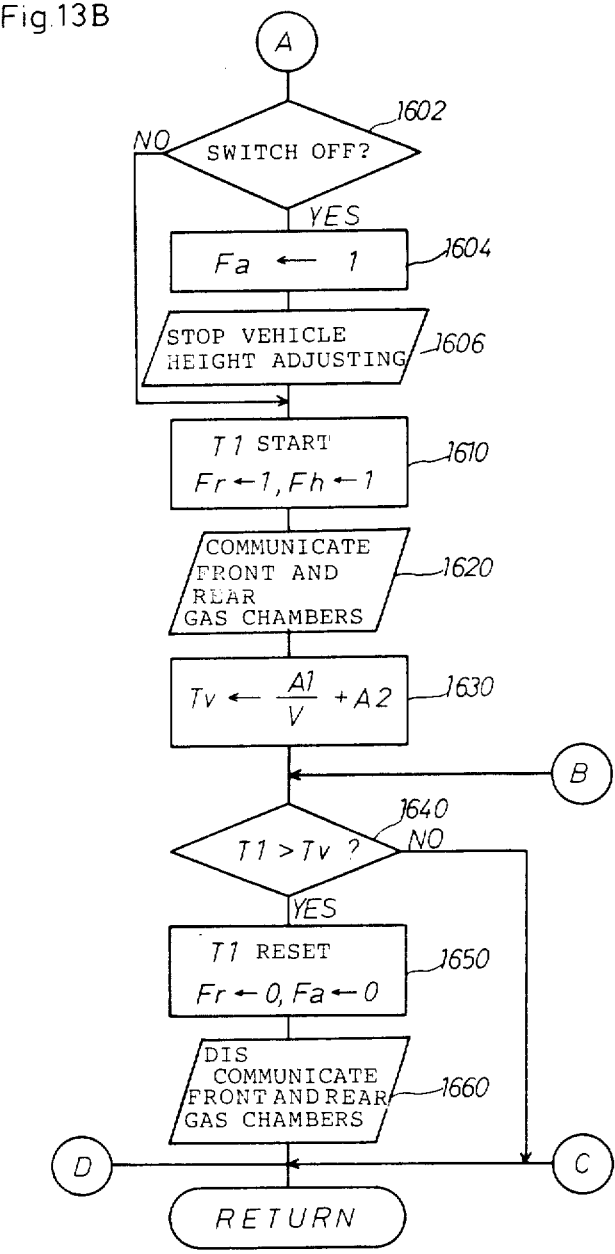

After Step 1610 shown in FIG. 13(B), the characteristic of the suspensions is altered (Step 1620). For this alteration, the CPU 301 sends out a signal to the leveling valves 151–154 to communicate the main air chambers 3b–6b of the air suspensions 3–6 with one another to make the characteristic of the suspensions 'soft' or decrease the spring constant thereof. As a result, the shock at each rear wheel is absorbed. It is seldom the case that the front and the rear wheels pass bumps simultaneously, when the prescribed softening effect is void.

After the alteration of the rear wheel suspension characteristic (Step 1620), the time Tv from the detection of the bump or dip in the road surface at the front wheel to the passing of the rear wheel over the bump or dip is calculated on the basis of the vehicle speed V as follows:

$$Tv = (A1/V) + A2$$

A1: Wheelbase
A2: Compensatory term (constant)

The compensatory term A2 is determined in consideration of the detection lags of the vehicle height sensors 1 and 2, the time taken for the rear wheel to move over the bump or dip in the road surface, etc.

It is judged (Step 1640) through comparison with the count of the timer T1 whether or not the time Tv determined in Step 1630 has elapsed since the alteration of the characteristic of the suspensions. If the count of the timer T1 is judged to be not larger than the time Tv, the process steps in the routine are terminated. If the count of the timer T1 is judged to have exceeded the time Time Tv, in other words, if the time Tv has elapsed since the characteristic of the suspensions was altered to be appropriate to the bump or dip in the road surface, the timer T1 is reset, and the flag Fr is also reset (Step 1650). For that reason 'NO' is taken in Step 810, which is for the incremental counting of the timer T1 as shown in FIG. 8, in the set state of the flag Fr, so that the incremental counting of the timer is stopped.

Finally, the process step for returning the characteristic of the suspensions to the original state is performed (Step 1660). That is, the main air chambers $3b-6b$ of the air suspensions 3-6 are discommunicated with one another by closing the leveling valves 151-154. Thus when the bump or dip in the road surface is detected at the front wheel, the characteristic of the suspensions is altered to prevent the rear portion of the vehicle from being shocked. After the vehicle has passed over the bump or dip, the characteristic of the suspension is returned to the original state. In this embodiment, the pressure difference switch 160 is disposed to detect the pressure difference of the main air chambers $3b$ and $5b$ and the main air chambers $3b-6b$ are communicated only when the pressure difference is smaller than a predetermined value. The reason is as follows. When the loads are greatly different between the front and the rear parts of the vehicle, the gas pressures are also greatly different between the front and the rear suspension air chambers. If the chambers are communicated in spite of the great pressure difference, the current posture of the vehicle changes abruptly and control and stability of the vehicle is deteriorated. The other effects by this embodiment are similar to the first embodiment.

What is claimed is:

1. A suspension controller for a vehicle having suspensions which comprise gas chambers for gas suspensions between the body and front and rear wheels respectively comprising:
   (a) front vehicle height detection means by which a distance between the front wheel and the body of the vehicle is detected to generate a front vehicle height signal;
   (b) judgment means by which said front vehicle height signal is compared with a predetermined reference signal to generate a judgment result signal when the front vehicle height signal is greater than the predetermined reference signal; and
   (c) suspension characteristic alteration means which comprise a passage connecting the gas chambers of the front and rear suspensions, and opening means that open the passage responsive to the generation of the judgment result signal.

2. A suspension controller as described in claim 1, wherein the suspension controller includes pressure detection means which detect pressure of the gas chambers of the front and rear suspensions and which generate a pressure difference signal when the pressure difference between the gas chambers of the front and rear suspensions is smaller than a predetermined value, and control means which generate a control signal when receiving both the judgment result signal and the pressure difference signal; and
   wherein said opening means open the passage responsive to the generation of the control signal.

3. A suspension controller as described in claim 1, wherein the judgment means generate a return signal a predetermined time after the judgment result signal is generated and the opening means close the passage responsive to the return signal.

4. A suspension controller as described in claim 2, wherein the control means generate a return signal a predetermined time after the judgment result signal is generated and the opening means close the passage responsive to the return signal.

5. A suspension controller as described in claim 1, wherein a signal indicating a displacement of the height of the vehicle from an average height thereof is generated as the front vehicle height signal by the front vehicle height detection means.

6. A suspension controller as described in claim 1, wherein a signal indicating a speed of the displacement of the height of the vehicle is generated as the front vehicle height signal by the front vehicle height detection means.

7. A suspension controller as described in claim 1, wherein a signal indicating an acceleration of the displacement of the height of the vehicle is generated as the front vehicle height signal by the front vehicle height detection means.

8. A suspension controller as described in claim 1, wherein a signal indicating an amplitude of the displacement of the height of the vehicle is generated as the front vehicle height signal by the front vehicle height detection means.

* * * * *

UNITED STATES PATENT AND TRADEMARK OFFICE
CERTIFICATE OF CORRECTION

PATENT NO. : 4,717,172

DATED : January 5, 1988

INVENTOR(S) : Ken ASAMI et al.

It is certified that error appears in the above-identified patent and that said Letters Patent is hereby corrected as shown below:

Cover page item number 73, change "OLYMPUS OPTICAL CO., LTD" to --TOYOTA JIDOSHA KABUSHIKI KAISHA--.

Signed and Sealed this

Twenty-eighth Day of June, 1988

Attest:

DONALD J. QUIGG

Attesting Officer

Commissioner of Patents and Trademarks